(12) United States Patent
Dinh et al.

(10) Patent No.: US 7,374,058 B2
(45) Date of Patent: May 20, 2008

(54) EXTENDABLE WHILE-IN-USE COVER

(75) Inventors: Cong Thanh Dinh, Collierville, TN (US); Claude James Bauer, Greenbrier, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 344 days.

(21) Appl. No.: 11/181,454

(22) Filed: Jul. 14, 2005

(65) Prior Publication Data

US 2006/0016809 A1 Jan. 26, 2006

Related U.S. Application Data

(60) Provisional application No. 60/590,834, filed on Jul. 23, 2004.

(51) Int. Cl.
*H02G 3/08* (2006.01)
*B65D 43/12* (2006.01)

(52) U.S. Cl. ..................... 220/3.8; 220/813

(58) Field of Classification Search ........... 220/3.8, 220/3.3, 813, 812, 811, 4.02; 174/167, 166, 174/50, 58, 63; 439/535; 248/906
See application file for complete search history.

(56) References Cited

U.S. PATENT DOCUMENTS

| | | | | |
|---|---|---|---|---|
| 1,481,415 A | * | 1/1924 | Casper | 220/4.02 |
| 1,486,415 A | * | 3/1924 | Casper | 220/3.8 |
| 2,457,023 A | * | 12/1948 | Zelt | 174/50 |
| 3,365,535 A | * | 1/1968 | Wilk | 174/50 |
| 4,322,702 A | * | 3/1982 | Bosch | 335/202 |
| 4,803,307 A | | 2/1989 | Shotey | |
| 4,874,906 A | | 10/1989 | Shotey | |
| 4,988,832 A | | 1/1991 | Shotey | |
| 5,045,640 A | | 9/1991 | Riceman | |
| 5,280,135 A | | 1/1994 | Berlin et al. | |
| 5,380,956 A | | 1/1995 | Loo et al. | |
| 5,456,377 A | | 10/1995 | Williams, Jr. | |
| 5,477,010 A | | 12/1995 | Buckshaw et al. | |
| 5,621,192 A | | 4/1997 | Bordwell et al. | |
| 5,773,760 A | | 6/1998 | Stark et al. | |
| 6,133,531 A | | 10/2000 | Hayduke et al. | |

(Continued)

*Primary Examiner*—Anthony D. Stashick
*Assistant Examiner*—Robert J Hicks
(74) *Attorney, Agent, or Firm*—Hoffman & Baron, LLP

(57) ABSTRACT

An expandable while-in-use cover includes: a cap having a pair of cap side walls, a first cap end wall, a second cap end wall and a top wall, which define a cap opening and a cap interior; a base having a pair of base side walls, a first base end wall, a second base end wall and a back wall, which define a base opening and a base exterior, wherein the base side walls and base end walls correspond to the cap side walls and cap end walls and wherein the cover is adapted to slidably and/or telescopically receive the base; a first and second prong on the interior of each of the cap side walls near the first and second cap end walls; a first and second slotted track on the exterior of each of the base side walls near the base end walls, wherein the first slotted track of each base side wall is adapted to receive the first prong of each cap side wall and the second slotted track of each base side wall is adapted to receive the second prong of each cap side wall; and an aperture in the back wall for accessing an electrical device.

18 Claims, 3 Drawing Sheets

U.S. PATENT DOCUMENTS 6,610,927 B2 *  8/2003  Dinh et al. .................. 174/66
6,677,519 B2 *  1/2004  Rumsey et al. ............... 174/50
6,909,047 B2 *  6/2005  Zhang ......................... 174/50

* cited by examiner

EXTENDABLE WHILE-IN-USE COVER

This application claims priority from provisional application Ser. No. 60/590,834, filed on Jul. 23, 2004.

FIELD OF THE INVENTION

The present invention relates to a while-in-use cover that encloses an electrical device. More specifically, the present invention relates to a while-in-use cover that is adjustable to accommodate different size plugs or wire bend radius inside the enclosed space.

BACKGROUND OF INVENTION

While-in-use covers are well known in the industry and are used to provide an enclosed housing for electrical devices such as electrical receptacles, ground fault circuit interrupters (GFCI), pushbuttons and switches. While-in-use covers can be installed over electrical devices without having to turn off the device and disconnect the wiring. This makes while-in-use covers convenient and easy to use. The purpose of the cover is primarily to prevent dust, water, and other foreign materials from entering the receptacle. It is of particular importance to prevent rain water from entering the electrical device in order to reduce the risk of short circuits, fire and damage to the device and the electrical system connected to it.

The previous while-in-use covers provide protection against water and dust but they are not versatile enough to be used for a broad range of applications. These while-in-use covers are often too small to house large plugs, for example, when a power cord that is plugged into a receptacle requires a converter plug. Moreover, the existing while-in-use covers provide fixed size enclosures and one cover cannot be used for a variety of applications. Further, electrical wire comes in different gauges with larger diameter wire having a larger bend radius than smaller diameter wire. Accordingly, it is desirable to provide a while-in-use cover that is adjustable and can expand to accommodate a variety of different size plugs and wire bend radii. It is also desirable to provide a while-in-use cover that can collapse or shrink in size when not in use or when its full extension is not required.

SUMMARY OF THE INVENTION

In accordance with the present invention, a while-in-use cover for an electrical device is provided. The while-in-use cover includes: a cap having a pair of cap side walls, a first cap end wall, a second cap end wall and a top wall, wherein the cap walls define a cap opening and a cap interior; a base comprising a pair of base side walls, a first base end wall, a second base end wall and a back wall, wherein the base walls define a base opening and a base exterior, wherein the base side walls and base end walls telescopically move with respect to the cap side walls and cap end walls; a first and second mating member on the interior of each of the cap side walls; a corresponding first and second inter-engaging member on the exterior of each of the base side walls, wherein the first inter-engaging member of each base side wall is adapted to receive the first mating member of each cap side wall and the second inter-engaging member of each base side wall is adapted to receive the second mating member of each cap side wall; and an aperture in the back wall for accessing an electrical device. The mating member can include a prong and the inter-engaging member can include an elongated track.

Another embodiment of the while-in-use cover includes: a cap having a top wall and a top transverse perimeter wall extending therefrom; a base having a back wall and a base transverse perimeter wall extending therefrom; at least one first sliding mechanism located on the cap; and at least one second mating sliding mechanism located on the base wherein the cap and the base slidably move with respect to each other. In addition, the while-in-use cover can include: at least one cap slot in the cap perimeter wall; and at least one base slot in the base perimeter wall, wherein the cap slot corresponds to the base slot and forms a slot opening when the cap receives the base. The sliding mechanism can include a complementary prong and track mechanism.

Still another embodiment of the while-in-use includes: a cap having a pair of cap side walls, a first cap end wall, a second cap end wall and a top wall, wherein the cap walls define a cap opening and a cap interior; a base comprising a pair of base side walls, a first base end wall, a second base end wall and a back wall, wherein the base walls define a base opening and a base exterior, wherein the base side walls and base end walls correspond to the cap side walls and cap end walls; a first mating structure on the cap side walls; and a second mating structure on the base side walls, wherein the first and second mating structure are adapted to pivotably and slidably receive the cap with respect to the base.

Preferred embodiments of the while-in-use cover include: at least one cap slot in the second cap end wall extending from the cap opening; and at least one base slot in the second base end wall extending from the base opening, wherein the cap slots correspond to the base slots and form a pair of slot openings when the cap receives the base.

Other preferred embodiments of the while-in-use cover include: a channel in the second cap end wall extending from the cap opening; and a channel track extending outwardly from the second base end, wherein the channel track is received by the channel when the cap receives the base. The while-in-use covers can also include a locking mechanism on the second base end wall which engages a latching device on the second cap end wall to secure the cap to the base.

The preferred embodiments of the while-in-use cover of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

Figure 1:
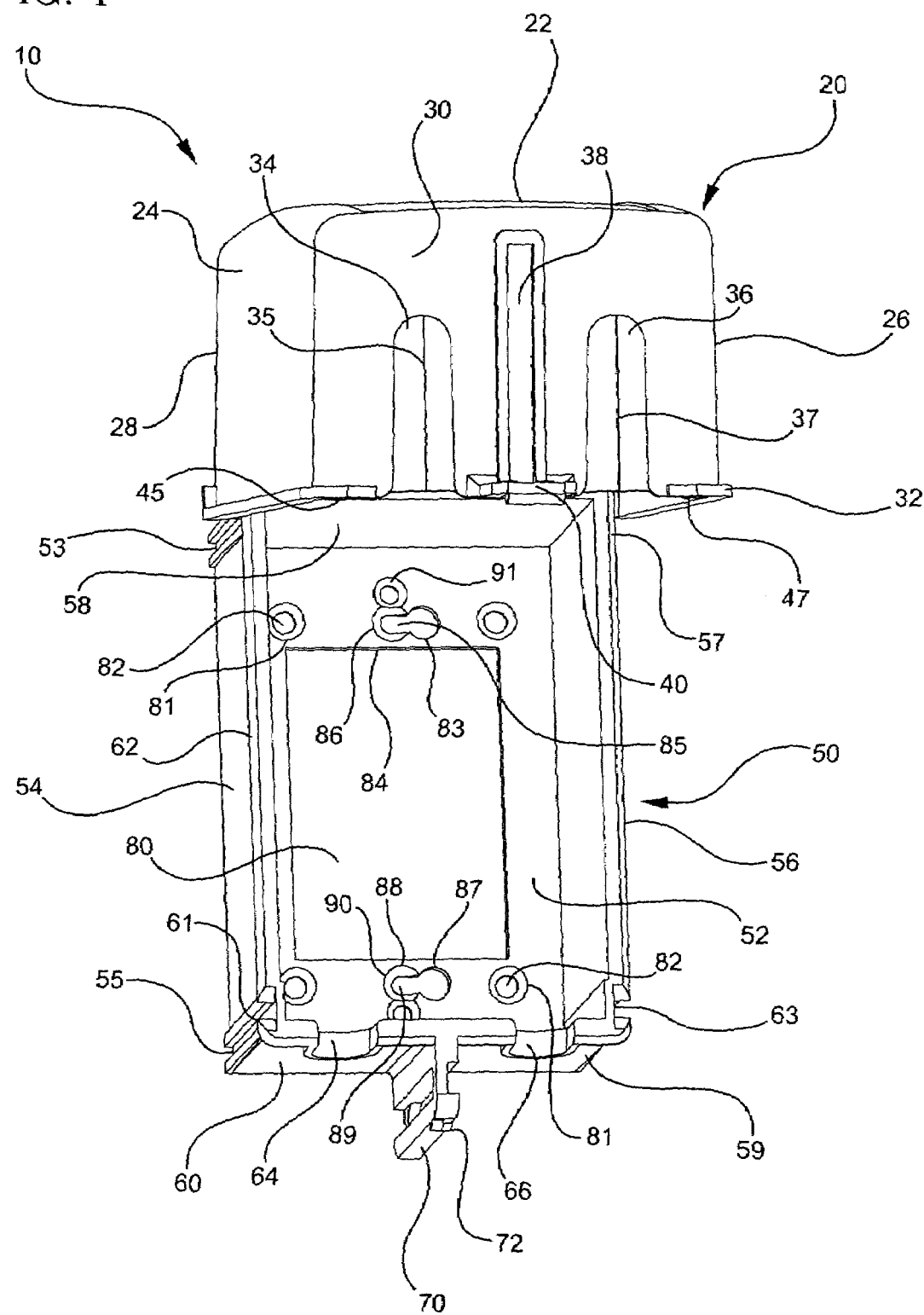
FIG. 1 shows a front view of one embodiment of the while-in use cover in the open position with a rectangular opening in the back wall.

The present invention is a while-in-use cover that can be expanded to increase the volume of the interior of the enclosure. The cover can be used as a standard size enclosure and can also be telescoped outwardly to form a larger enclosure that accommodates larger plugs or larger bend radius.

The while-in-use cover includes a cap that is pivotably mounted to a base. The cap has a substantially flat, rectangular top wall with first and second side walls and adjoining first and second end walls that extend downwardly from the top wall and terminate in an edge (preferably, a flanged edge) to form a box-like structure with an open side. The second end wall has a channel in the center of the wall which extends from the edge towards the top wall with a latching device located at the edge that extends across the channel. In preferred embodiments, a gasket is formed on the flanged edge.

On either side of the channel are two slots in the second end wall which are parallel to each other and to the channel. The slots extend at least one third of the distance from the edge to the top wall and, preferably, at least one half the distance. The first and second end walls and the first and second side walls are substantially flat. In preferred embodiments, the corners of the cap where the walls join are rounded off so that there are no sharp edges.

Each of the cap side walls has two mating members, which preferably include a prong, on the interior surface located at the opposing ends. The prongs extend inwardly and perpendicularly to the interior surface of the side walls and are received by the slotted tracks in the base.

The base has a substantially flat, rectangular back wall with first and second side walls and adjoining first and second end walls that extend upwardly from the back wall and terminate in an edge (preferably, a flanged edge) to form a box-like structure with an open side. The dimensions of the base opening are such that the open side of the base slidably fits into the open side of the cap. In preferred embodiments, a gasket is formed on the edge of the base opening.

The exterior side walls of the base have inter-engaging members, which preferably include a slotted track, on each end which extend from the back wall to the edge. In a preferred embodiment, the slotted tracks on opposing side walls at one end of the base extend through the edge. These slotted tracks are designed to slidably receive the prongs located on the interior side walls of the cap. The dimensions of this box-like structure are selected so that, when the cap is telescopically or slidably positioned over the base, the gasket on the flanged edge of the base contacts the interior walls of the cap.

The second end wall of the base has a track in the center of the wall which extends outwardly from the exterior surface of the wall between the back wall and the edge. The track is designed to fit within the channel in the cap and it has at least one locking mechanisms for engaging the latching device on the cap. In embodiments of the invention having more than one locking mechanism, the different locking mechanisms are located at intervals along the track and allow the cap to be locked at different fixed positions in order to vary the size of the enclosure.

The back wall of the base has an aperture or opening for an electrical device and apertures for mounting screws. The size and location of the aperture for the electrical device vary according to the type of electrical device. One preferred embodiment has a rectangular aperture suitable for a GFCI or switch and another preferred embodiment has two apertures for the socket faces of an electrical receptacle.

In one embodiment, the back wall has a pair of keyhole slots for the mounting screws that are located along the longitudinal axis of the back wall and correspond to the apertures on a typical electrical receptacle. The keyhole slots have a large aperture that is larger than the head of a mounting screw and a small aperture that is smaller then the head of a mounting screw. Preferably, the line between the centers of the small and large apertures in each keyhole slot is perpendicular to the longitudinal axis of the back wall.

The keyhole slot allows an installer of the while-in-use cover of the present invention to simply back out the existing screws of a duplex receptacle, or similar electrical device, rather than completely removing them. After the screws are backed out, the large apertures are placed over the heads of the screws. Once the heads extend inside the back wall, the cover is moved sideways (i.e., in the direction from the large aperture towards the small aperture) so that the shaft of the screw enters the small aperture. The screw can then be tightened to secure the cover to the electrical device. In preferred embodiments, the area around the small aperture of each of the keyhole slots is recessed or beveled so that the head of the mounting screw is flush with the back wall when the screw is tightened.

Looking now at the drawings, FIG. 1 shows an embodiment of the cover 10 of the present invention, wherein the cap 20 is pivotably attached to the base 50 in the open position. The cap 20 has a top wall 22, two side walls 24, 26 and two end walls 28, 30. The side walls 24, 26 adjoin the end walls 28, 30 and extend downwardly from the top wall 22 to a flanged edge 32. One end wall 30 has two slots 34, 36 that provide access for electrical power cords (not shown). A channel 38 is located in the middle of end wall 30 and extends upwardly from the flanged edge 32. A latching device 40 extends outwardly from the flanged edge 32 and extends from one side of the channel 38 to the other. In a preferred embodiment, the slots 34, 36 have flexible curtains 35, 37 with slits in the middle that extend the length of the slots 34, 36. These curtains 35, 37 are preferably made from rubber and conform to the shape of power cords passing through the slots 34, 36 to prevent dust and moisture from entering the cover 10.

Each of the side walls 24, 26 have two prongs 45 and 47 (the second prong is not shown), respectively, located at opposing ends of the side walls 24, 26 and near the flanged edge 32. The prongs 45 and 47 extend inwardly from the interior surface of the side walls 24, 26.

The base 50 of the cover 10 has a back wall 52, two side walls 54, 56 and two end walls 58, 60. The adjoining side walls 54, 56 and end walls 58, 60 extend upwardly from the back wall 52 to form a flanged edge 62. The end wall 60 has two slots 64, 66 that correspond to the slots 34, 36 in the cap 20 and form adjustable openings in the cover 10 as the cap 20 slidably receives the base 50. A channel track 70 for receiving the channel 38 in the cap 20 extends outwardly from the end wall 60 of the base 50 from the back wall 52 to the flanged edge 62. The channel track 70 has at least one locking mechanism 72 for engaging the latching device 40 and securing the cap 20 to the base 50 in a fixed position.

The side walls 54, 56 of the base 50 each have a pair of slotted tracks 53, 55 and 57, 59, respectively, at opposing ends of the walls 54, 56 which extend from the back wall 52 to the flanged edge 62. These slotted tracks 53, 55 and 57, 59 receive the prongs 45, 47 (only two of the four prongs are shown) extending from the interior surfaces of the side walls 24, 26 of the cap 20. In a preferred embodiment, two of the slotted tracks 55, 59 on one end of the base 50 extend through openings 61, 63 in the flanged edge 62 and the other two slotted tracks 53, 57 extend up to (but not through) the flanged edge 62.

The cap 20 is pivotably connected to one end of the base 50 by a first pair of prongs (not shown in FIG. 1, but shown in FIG. 3 as 144, 146) on slotted tracks 53, 57 on opposing side walls 54, 56 of the base 50. When the prongs are inserted into the slotted tracks 53, 57 at the back wall 52, they slidably move along the tracks 53, 57 until the tracks 53, 57 end at the flanged edge 62. The cap 20 is then pivoted against the flanged edge 62 so that the prongs 45, 47 on the opposing end of the cap 20 fit within the other two slotted tracks 55, 59 through openings 61, 63 in the flanged edge 62. Hence cap 20 can be slidably moved with respect to base 50 or, in other words, cap 20 and base 50 move telescopically with respect to each other. Also, the expandable arrangement of cap 20 and base 50 is such that when box 10 is not in use or its full expandable range is not needed, it may be collapsed or shrunk in size to avoid extending too far outward from its supporting wall structure.

In one embodiment of the present invention, the second pair of prongs 45, 47 that are received after the cap 20 is pivoted into position are replaced by a pair of rails (not shown) which extend inwardly and perpendicularly to the interior surfaces of the cap side walls 54, 56. These rails receive the slotted tracks 55, 59 and permit the cap 20 to slidably move up and down around the base 50. The lengths of the rails can vary, preferably the rails extend from above the flanged cap edge 32 to at least the mid-point of the side walls 24, 26.

When the cap 20 is positioned on the base 50, the channel track 70 receives the channel 38 in the cap 20 and the latching device 40 engages one of the one or more locking mechanisms 72 on the channel track 70. When force is applied to the latching device 40, it disengages the locking mechanism 72 and the cap 20 can be freely moved up and down. Preferably, the force is a downward force. When the downward force is removed from the latching device 40, it engages one of the locking mechanisms 72 and the cap 20 is locked into a fixed position. This allows the size of the enclosure formed by the expandable cover 10 to be quickly and easily increased or decreased.

The back wall 52 of the base 50 has a rectangular aperture 80 that provides access to an electrical device (not shown). Four mounting screw apertures 82 surrounded by a bevel 81 are located at the four corners of the aperture 80. In addition, two keyhole slots 84, 88 each having a large aperture 83, 87 and a small aperture 85, 89 with a bevel 86, 90 are located on either side of the aperture 80. The small apertures 85, 89 are located on the longitudinal axis of the base 50. The keyhole slot centerline (i.e., the line between the center of the large aperture 83, 87 and the center of the small aperture 85, 89 of the keyhole slots 84, 88) is perpendicular to the longitudinal axis. The back wall 52 also has additional apertures 91 to accommodate a variety of different mounting screw configurations.

Figure 2:
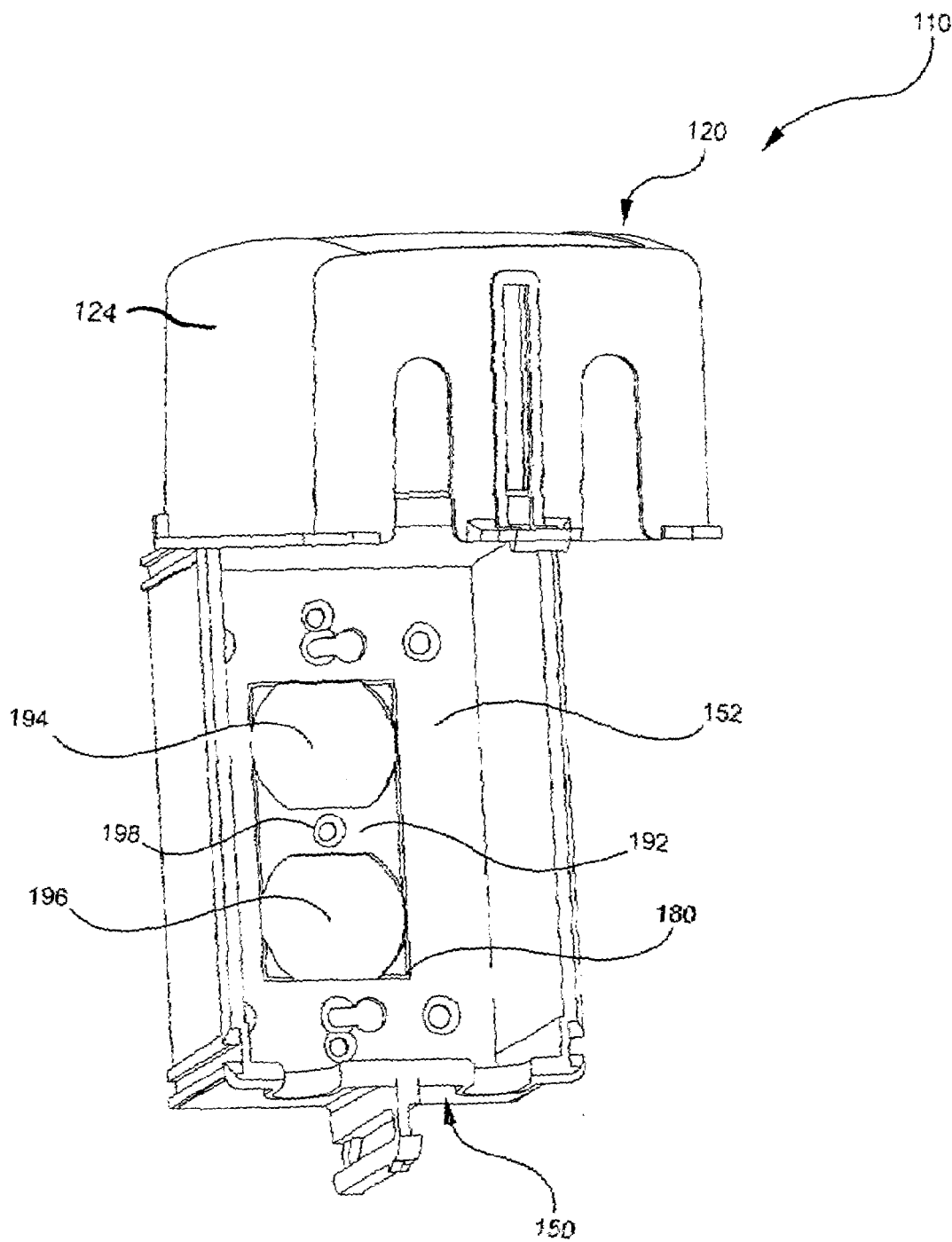
FIG. 2 shows a front view of one embodiment of the while-in use cover in the open position with a detachable plate having two socket face apertures in the back wall.

FIG. 2 shows a front view of another embodiment of the cover 110 of the present invention that is substantially the same as the embodiment shown in FIG. 1 except for the back wall 152. In this embodiment, a plate 192 is removably attached to the aperture 180 in the back wall 152. In a preferred embodiment, the plate 192 includes two socket face apertures 194, 196 for mounting over an electrical outlet and the plate 192 can also include a mounting screw aperture 198 between the two socket face apertures 194, 196. In other embodiments (not shown) the plate 192 can have a variety of different size apertures to accommodate a variety of different electrical switches, pushbuttons, sockets and other devices. The removable plate 192 allows the cover 110 to be quickly and easily modified to accommodate different types of electrical devices.

Figure 3:
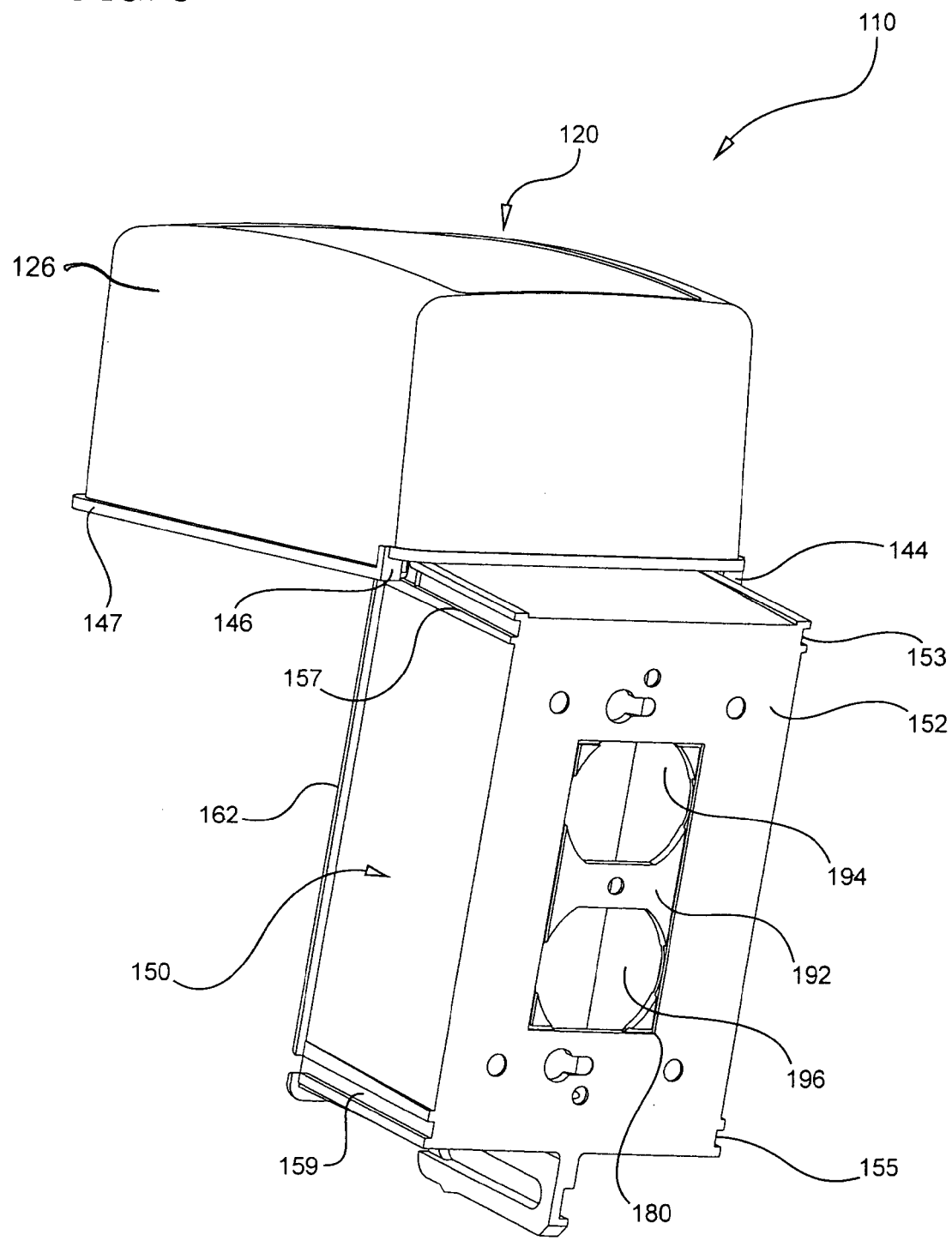
FIG. 3 shows a rear view of one embodiment of the while-in use cover in the open position with a detachable plate having two socket face apertures in the back wall.

FIG. 3 shows a rear view of the cover 110 with the removable plate 192 shown in FIG. 2. FIG. 3 illustrates how the prongs 144, 146 on opposing side walls 124, 126 at one end of the cap 120 are slidably inserted into the slotted tracks 153, 157 at one end of the base 150 from the direction of the back wall 152. The prongs 144, 146 slide to the end of the slotted tracks 153, 157 until they reach the flanged edge 162 of the base 150. The cap 120 is then pivoted until the prongs 147 (only one prong is shown) at the other end of the cap 120 receive the two slotted tracks 155, 159 on the opposing end of the base 150. The cap 120 can then be slidably moved up and down along the slotted tracks 153, 155, 157, 159 to vary the size of the enclosed space formed by the cap 120 and the base 150.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A while-in-use electrical box cover comprising:
   a cap having a pair of cap side walls, a first cap end wall, a second cap end wall and a top wall, wherein the cap walls define a cap opening and a cap interior;
   a base comprising a pair of base side walls, a first base end wall, a second base end wall and a back wall, wherein the base walls define a base opening and a base exterior, wherein the cap side walls and cap end walls telescopically move with respect to the base side walls and base end walls;
   first and second mating members on the interior of each of the cap side walls;
   first and second inter-engaging members on the exterior of each of the base side walls extending substantially between the base opening and the back wall, wherein the first inter-engaging member of each base side wall is adapted to receive the first mating member of each cap side wall and the second inter-engaging member of each base side wall is adapted to receive the second mating member of each cap side wall; and
   an aperture in the back wall for accessing an electrical device.

2. The while-in-use electrical box cover according to claim 1, wherein each of the mating members comprises a prong and wherein each of the inter-engaging members comprises an elongated track.

3. The while-in-use electrical box cover according to claim 1, further comprising:
   at least one cap slot in the second cap end wall extending from the cap opening; and
   at least one base slot in the second base end wall extending from the base opening, wherein the cap slots correspond to the base slots and form a pair of slot openings when the cap receives the base.

4. The while-in-use electrical box cover according to claim 3, further comprising:
   a channel in the second cap end wall extending from the cap opening; and
   a channel track extending outwardly from the second base end, wherein the channel track is received by the channel when the cap receives the base.

5. The while-in-use electrical box cover according to claim 4, further comprising a locking mechanism on the second base end wall which engages a latching device on the second cap end wall to secure the cap to the base.

6. A while-in-use electrical box cover comprising:
   a cap having a top wall and a top transverse perimeter wall extending therefrom;
   a base having a back wall and a base transverse perimeter wall extending therefrom to define an opening;
   at least one first sliding mechanism located on the cap; and
   at least one second mating sliding mechanism located on the base, wherein the at least one second mating sliding mechanism extends substantially between the back wall and the opening,
   wherein the at least one first sliding mechanism engages the at least one second mating sliding mechanism so that the cap and the base slidably and telescopically move with respect to each other.

7. The while-in-use electrical box cover according to claim 6, further comprising:
   at least one cap slot in the cap perimeter wall; and
   at least one base slot in the base perimeter wall, wherein the cap slot corresponds to the base slot and forms a slot opening when the cap receives the base.

8. The while-in-use electrical box cover according to claim 7, wherein the sliding mechanism comprises a complementary prong and track mechanism.

9. The while-in-use electrical box cover according to claim 7, further comprising:
   a latching device which extends outwardly from the cap perimeter wall; and
   a locking mechanism on the base perimeter wall which engages the latching device to secure the cap to the base.

10. A while-in-use electrical box cover comprising:
    a cap having a pair of cap side walls, a first cap end wall, a second cap end wall and a top wall, wherein the cap walls define a cap opening and a cap interior;
    a base comprising a pair of base side walls, a first base end wall, a second base end wall and a back wall, wherein the base walls define a base opening and a base exterior, wherein the base side walls and base end walls correspond to the cap side walls and cap end walls;
    a first mating structure on each of the cap side walls; and
    a second mating structure on each of the base side walls, wherein the second mating structures extend substantially between the back wall and the base opening, wherein the first and second mating structures are adapted to pivotably and slidably receive the cap with respect to the base.

11. The while-in-use electrical box cover according to claim 10, further comprising:
    a pair of cap slots in the second cap end wall extending from the cap opening; and
    a pair of base slots in the second base end wall extending from the base opening, wherein the cap slots correspond to the base slots and form a pair of slot openings when the cap receives the base.

12. A while-in-use electrical box cover comprising:
    (a) a cap having a top wall and a top perimeter wall extending therefrom and forming a cap interior, wherein the top perimeter wall has at least two prongs extending into the cap interior;
    (b) a base having a back wall and a base perimeter wall extending therefrom and forming a base interior and defining a base opening, wherein the base perimeter wall has at least two slotted tracks extending substantially between the back wall and the base opening; and
    (c) one or more apertures in the back wall for securing the base to an electrical box;
    wherein the at least two prongs engage the at least two slotted tracks so that the perimeter wall of the cap is telescopically movable with respect to the base perimeter wall, and wherein the cap is pivotably operable between an open and a closed position for selectively providing or blocking access to the base interior.

13. The while-in-use electrical box cover according to claim 12, wherein the base includes a stop, the stop limiting the telescopic movement of the cap.

14. The while-in-use electrical box cover according to claim 12, wherein the base perimeter wall extends to form a flange surrounding at least a portion of the base.

15. The while-in-use electrical box cover according to claim 14, wherein the base includes a stop formed by the flange, the stop limiting the telescopic movement of the cap.

16. The while-in-use electrical box cover according to claim 12, wherein the back wall has an aperture for accessing electrical devices.

17. The while-in-use electrical box cover according to claim 12, wherein the back wall of the base includes apertures for attaching electrical devices.

18. The while-in-use electrical box cover according to claim 12, wherein the perimeter wall of the cap includes one or more slots for one or more passing power cords into the cover.

* * * * *